(12) United States Patent
Hwang et al.

(10) Patent No.: US 9,679,608 B2
(45) Date of Patent: Jun. 13, 2017

(54) PACING CONTENT

(75) Inventors: Douglas C. Hwang, New York, NY (US); Ajay Arora, New York, NY (US); Douglas S. Goldstein, Riverdale, NY (US); Shirley C. Yang, New York, NY (US)

(73) Assignee: Audible, Inc., Newark, NJ (US)

( * ) Notice: Subject to any disclaimer, the term of this patent is extended or adjusted under 35 U.S.C. 154(b) by 435 days.

(21) Appl. No.: 13/536,711

(22) Filed: Jun. 28, 2012

(65) Prior Publication Data

US 2014/0005814 A1    Jan. 2, 2014

(51) Int. Cl.
  G11B 27/02    (2006.01)
  G11B 27/10    (2006.01)
  G11B 27/00    (2006.01)
  G06F 17/00    (2006.01)

(52) U.S. Cl.
  CPC .......... G11B 27/105 (2013.01); G11B 27/005 (2013.01)

(58) Field of Classification Search
  CPC ....... G11B 27/00; G11B 27/005; G11B 27/10; G11B 27/11; G11B 27/36; G11B 7/005; G11B 19/26; G11B 19/28; G11B 20/00007; G11B 20/10; G11B 27/031; G11B 27/034; G11B 27/105; G11B 2020/10546; G11B 2020/10916; G11B 2020/10944; G11B 2220/2545; G11B 2220/2562; G10H 2210/391; G10L 21/04; G10L 21/043; H04N 5/783; H04N 21/6587; H04N 21/8455; H04N 21/8456
  USPC ............. 84/612; 386/241, 248, 343, E5.052, 386/E9.013; 700/94; 704/E21.017; 709/203, 219, 224, 231; 725/88
  See application file for complete search history.

(56) References Cited

U.S. PATENT DOCUMENTS

| | | |
|---|---|---|
| 5,203,705 A | 4/1993 | Hardy et al. |
| 5,351,189 A | 9/1994 | Doi et al. |
| 5,657,426 A | 8/1997 | Waters et al. |
| 5,737,489 A | 4/1998 | Chou et al. |

(Continued)

FOREIGN PATENT DOCUMENTS

| | | |
|---|---|---|
| CN | 103988193 A | 8/2014 |
| CN | 104662604 A | 5/2015 |

(Continued)

OTHER PUBLICATIONS

International Search Report and Written Opinion in PCT/US2014/014508 mailed Jun. 25, 2014.

(Continued)

*Primary Examiner* — Duc Nguyen
*Assistant Examiner* — Alexander Eljaiek
(74) *Attorney, Agent, or Firm* — Knobbe, Martens, Olson & Bear, LLP

(57) ABSTRACT

Users may have a set duration during which they may consume content, or they may have a variable duration during which they may consume content. A content pacing service is disclosed so that a portion of an item of content may be conveyed in the set duration during which a user is to consume the content. In one embodiment, the rate at which the content is conveyed is increased or decreased so that a reference point in the item of content (e.g., the end of a chapter in an audiobook) is reached approximately when the duration of the user's content consumption ends.

11 Claims, 7 Drawing Sheets

(56) References Cited

U.S. PATENT DOCUMENTS

| | | | |
|---|---|---|---|
| 5,978,754 A | 11/1999 | Kumano | |
| 6,076,059 A | 6/2000 | Glickman et al. | |
| 6,088,711 A | 7/2000 | Fein et al. | |
| 6,208,956 B1 | 3/2001 | Motayama | |
| 6,256,610 B1 | 7/2001 | Baum | |
| 6,260,011 B1 | 7/2001 | Heckerman et al. | |
| 6,356,922 B1 | 3/2002 | Schilit et al. | |
| 6,766,294 B2 | 7/2004 | MacGinite et al. | |
| 6,912,505 B2 | 6/2005 | Linden et al. | |
| 7,003,515 B1 | 2/2006 | Glaser et al. | |
| 7,107,533 B2 | 9/2006 | Duncan et al. | |
| 7,231,351 B1 | 6/2007 | Griggs | |
| 8,106,285 B2 | 1/2012 | Gerl et al. | |
| 8,109,765 B2 | 2/2012 | Beattie et al. | |
| 8,131,545 B1 | 3/2012 | Moreno et al. | |
| 8,131,865 B2 | 3/2012 | Rebaud et al. | |
| 8,234,494 B1 | 7/2012 | Bansal et al. | |
| 8,442,423 B1 | 5/2013 | Ryan et al. | |
| 8,527,272 B2 | 9/2013 | Qin et al. | |
| 8,548,618 B1 | 10/2013 | Story, Jr. et al. | |
| 8,577,668 B2 | 11/2013 | Rosart et al. | |
| 8,855,797 B2 | 10/2014 | Story, Jr. et al. | |
| 8,862,255 B2 | 10/2014 | Story, Jr. et al. | |
| 8,948,892 B2 | 2/2015 | Story, Jr. et al. | |
| 9,037,956 B2 | 5/2015 | Goldstein et al. | |
| 9,099,089 B2 | 8/2015 | Dzik et al. | |
| 9,280,906 B2 | 3/2016 | Arora et al. | |
| 9,317,500 B2 | 4/2016 | Hwang | |
| 2002/0002459 A1 | 1/2002 | Lewis et al. | |
| 2002/0007349 A1 | 1/2002 | Yuen | |
| 2002/0041692 A1 | 4/2002 | Seto et al. | |
| 2002/0116188 A1 | 8/2002 | Amir et al. | |
| 2002/0184189 A1 | 12/2002 | Hay et al. | |
| 2003/0061028 A1 | 3/2003 | Dey et al. | |
| 2003/0065503 A1 | 4/2003 | Agnihotri et al. | |
| 2003/0083885 A1 | 5/2003 | Frimpong-Ansah | |
| 2003/0115289 A1 | 6/2003 | Chinn et al. | |
| 2004/0261093 A1 | 12/2004 | Rebaud et al. | |
| 2005/0022113 A1 | 1/2005 | Hanlon | |
| 2006/0148569 A1 | 7/2006 | Beck | |
| 2007/0016314 A1 | 1/2007 | Chan et al. | |
| 2007/0061487 A1 | 3/2007 | Moore et al. | |
| 2007/0136459 A1 | 6/2007 | Roche et al. | |
| 2007/0276657 A1 | 11/2007 | Gournay et al. | |
| 2007/0282844 A1 | 12/2007 | Kim et al. | |
| 2008/0005656 A1 | 1/2008 | Pang et al. | |
| 2008/0027726 A1 | 1/2008 | Hansen et al. | |
| 2008/0177822 A1 | 7/2008 | Yoneda | |
| 2008/0294453 A1 | 11/2008 | Baird-Smith et al. | |
| 2009/0047003 A1* | 2/2009 | Yamamoto | 386/126 |
| 2009/0136213 A1 | 5/2009 | Calisa et al. | |
| 2009/0210213 A1 | 8/2009 | Cannon et al. | |
| 2009/0222520 A1 | 9/2009 | Sloo et al. | |
| 2009/0228570 A1 | 9/2009 | Janik et al. | |
| 2009/0233705 A1 | 9/2009 | Lemay et al. | |
| 2009/0276215 A1 | 11/2009 | Hager | |
| 2009/0281645 A1 | 11/2009 | Kitahara et al. | |
| 2009/0305203 A1 | 12/2009 | Okumura et al. | |
| 2009/0319273 A1 | 12/2009 | Mitsui et al. | |
| 2010/0042682 A1 | 2/2010 | Kaye | |
| 2010/0042702 A1 | 2/2010 | Hanses | |
| 2010/0064218 A1 | 3/2010 | Bull et al. | |
| 2010/0070575 A1 | 3/2010 | Bergquist et al. | |
| 2010/0225809 A1 | 9/2010 | Connors et al. | |
| 2010/0279822 A1 | 11/2010 | Ford | |
| 2010/0286979 A1 | 11/2010 | Zangvil et al. | |
| 2010/0287256 A1 | 11/2010 | Neilio | |
| 2011/0067082 A1 | 3/2011 | Walker | |
| 2011/0087802 A1 | 4/2011 | Witriol et al. | |
| 2011/0119572 A1 | 5/2011 | Jang et al. | |
| 2011/0153330 A1 | 6/2011 | Yazdani et al. | |
| 2011/0177481 A1 | 7/2011 | Haff et al. | |
| 2011/0184738 A1 | 7/2011 | Kalisky et al. | |
| 2011/0191105 A1 | 8/2011 | Spears | |
| 2011/0231474 A1 | 9/2011 | Locker et al. | |
| 2011/0246175 A1 | 10/2011 | Yi et al. | |
| 2011/0288861 A1 | 11/2011 | Kurzweil et al. | |
| 2011/0288862 A1 | 11/2011 | Todic | |
| 2011/0296287 A1 | 12/2011 | Shahraray et al. | |
| 2011/0320189 A1 | 12/2011 | Carus et al. | |
| 2012/0030288 A1 | 2/2012 | Burckart et al. | |
| 2012/0109640 A1 | 5/2012 | Anisimovich et al. | |
| 2012/0150935 A1 | 6/2012 | Frick et al. | |
| 2012/0166180 A1 | 6/2012 | Au | |
| 2012/0197998 A1 | 8/2012 | Kessel et al. | |
| 2012/0245719 A1 | 9/2012 | Story, Jr. et al. | |
| 2012/0245720 A1 | 9/2012 | Story, Jr. et al. | |
| 2012/0245721 A1 | 9/2012 | Story, Jr. et al. | |
| 2012/0246343 A1 | 9/2012 | Story, Jr. et al. | |
| 2012/0310642 A1 | 12/2012 | Cao et al. | |
| 2012/0315009 A1 | 12/2012 | Evans et al. | |
| 2012/0324324 A1 | 12/2012 | Hwang et al. | |
| 2013/0041747 A1 | 2/2013 | Anderson et al. | |
| 2013/0073449 A1 | 3/2013 | Voynow et al. | |
| 2013/0073675 A1 | 3/2013 | Hwang et al. | |
| 2013/0074133 A1 | 3/2013 | Hwang et al. | |
| 2013/0130216 A1 | 5/2013 | Morton et al. | |
| 2013/0212454 A1 | 8/2013 | Casey | |
| 2013/0253833 A1* | 9/2013 | Tuukkanen | 701/538 |
| 2013/0257871 A1 | 10/2013 | Goldstein et al. | |
| 2013/0262127 A1 | 10/2013 | Goldstein et al. | |
| 2014/0039887 A1 | 1/2014 | Dzik et al. | |
| 2014/0040713 A1 | 2/2014 | Dzik et al. | |
| 2014/0223272 A1 | 8/2014 | Arora et al. | |
| 2014/0250219 A1 | 9/2014 | Hwang | |
| 2015/0026577 A1 | 1/2015 | Story et al. | |
| 2015/0340038 A1 | 11/2015 | Dzik et al. | |

FOREIGN PATENT DOCUMENTS

| | | |
|---|---|---|
| EP | 2689342 | 1/2014 |
| EP | 2689346 | 1/2014 |
| JP | 9-265299 | 10/1997 |
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 | 7/2005 |
| JP | 2005-223451 A | 8/2005 |
| JP | 2007-522591 | 8/2007 |
| JP | 2007-249703 | 9/2007 |
| JP | 2010-250023 | 11/2010 |
| NZ | 532174 | 11/2012 |
| WO | WO 2006/029458 A1 | 3/2006 |
| WO | WO 2007/108337 A1 | 9/2007 |
| WO | WO 2011/144617 A1 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Munroe, Randall, "My Hobby: Embedding NP-Complete Problems in Restaurant Orders," Jul. 9, 2007, http://xkcd.com/287.
Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.
Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.
Arar, Y., Blio E-Book Platform: No Reader (Yet), But Great Graphics, Jan. 7, 2010.
Beattie, V., et al., Reading Assistant: Technology for Guided Oral Reading, Scientific Learning, Apr. 10, 2012, 5 pages.
Dzik, S.C., U.S. Appl. No. 13/604,482, filed Sep. 5, 2012, entitled Identifying Corresponding Regions of Content.

(56) References Cited

OTHER PUBLICATIONS

Dzik, S.C., U.S. Appl. No. 13/604,486, filed Sep. 5, 2012, entitled Selecting Content Portions for Alignment.
Dzik, S.C., U.S. Appl. No. 13/662,306, filed Oct. 26, 2012, entitled Content Presentation Analysis.
Hwang, D.C., et al., U.S. Appl. No. 13/536,711, filed Jun. 28, 2012, entitled Pacing Content.
International Search Report issued in connection with International Patent Application No. PCTUS12/30186 mailed on Jun. 20, 2012, 12 pages.
International Search Report issued in connection with International Patent Application No. PCT/US12/30198 mailed on Jun. 20, 2012, 16 pages.
International Search Report issued in connection with International Application No. PCT/US13/47866 mailed on Sep. 9, 2013.
International Search Report and Written Opinion in PCT/US2013/042903 mailed Feb. 7, 2014.
International Search Report issued in connection with International Application No. PCT/US13/53020 mailed on Dec. 16, 2013.
Levinson, S.E., et al., Continuous Speech Recognition from a Phonetic Transcription, Acoustics, Speech, and Signal Processing, Apr. 1990, pp. 190-199.
Vignoli, F., et al., A Text-Speech Synchronization Technique With Applications to Talking Heads, Auditory-Visual Speech Processing, ISCA Archive, Aug. 7-10, 1999.
Weber, F.V., U.S. Appl. No. 13/531,376, filed Jun. 22, 2012, entitled Modelling Expected Errors for Discriminative Training.
International Preliminary Report on Patentability issued in connection with International Patent Application No. PCT/US12/30198 mailed on Jan. 30, 2014, 8 pages.
Extended Search Report in European Application No. (12761404.8) dated Jan. 26, 2015.
Office Action in Japanese Application No. 2014-501254 dated Oct. 14, 2014.
Office Action in Japanese Application No. 2014-501254 dated May 11, 2015.
Office Action in Canadian Application No. 2830622 dated Jun. 10, 2015.
Extended Search Report in European Application No. 12761104.4 dated Apr. 20, 2015.
Office Action in Canadian Application No. 2830906 dated Mar. 17, 2015.
Office Action in Japanese Application No. 2014-501257 dated Apr. 6, 2015.
International Preliminary Report on Patentability in PCT/US2013/042903 mailed Dec. 2, 2014.
International Preliminary Report issued in connection with International Application No. PCT/US13/53020 mailed on Feb. 12, 2015.
International Preliminary Search Report on Patentability in PCT/US2014/014508 mailed Aug. 4, 2015.
Ikura, et al., A Method of Synchronizing Voice Data With Corresponding Japanese Text Automatically, Magazine of IEICE Theses; Japan, The Institute of Electronics, Information and Communication Engineers; Feb. 1, 2006; vol. J89-D, No. 2, pp. 261-270.
Extended Search Report in European Application No. 13825574 dated Feb. 10, 2016.

* cited by examiner

PACING CONTENT

BACKGROUND

Generally described, computing devices may convey items of digital content to users. For example, computing devices may visually convey items of content such as animations, electronic books, electronic periodicals, movies, television programs, multi-media content, and portions thereof on an electronic screen or touchscreen. Computing devices may also direct audible output through headphones or speakers to convey items of audible content such as audiobooks, songs, movies, television programs, multi-media content, and portions thereof.

Users of content often like to reach "stopping points" (such as the end of an episode or chapter) before they pause or stop their use of content. Unfortunately, users are not always in a position to control when they consume content. For example, a user may only have a limited duration of time during which to consume content, perhaps during a plane flight, train ride, or commute. Because users cannot always control when they can consume content, often they may have to pause or stop the content at inconvenient positions in the content. For example, a user may listen to an audiobook using his or her user computing device. The user may be required to turn off his or her user computing device during a flight, and may accordingly have to stop listening to an audiobook in the middle of a word or sentence. In other instances items of content are abridged to fit within a limited duration. For example, a movie displayed during a flight may have one or more scenes removed therefrom. These outcomes can prove frustrating and inconvenient for users and can persist across many different types of content.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
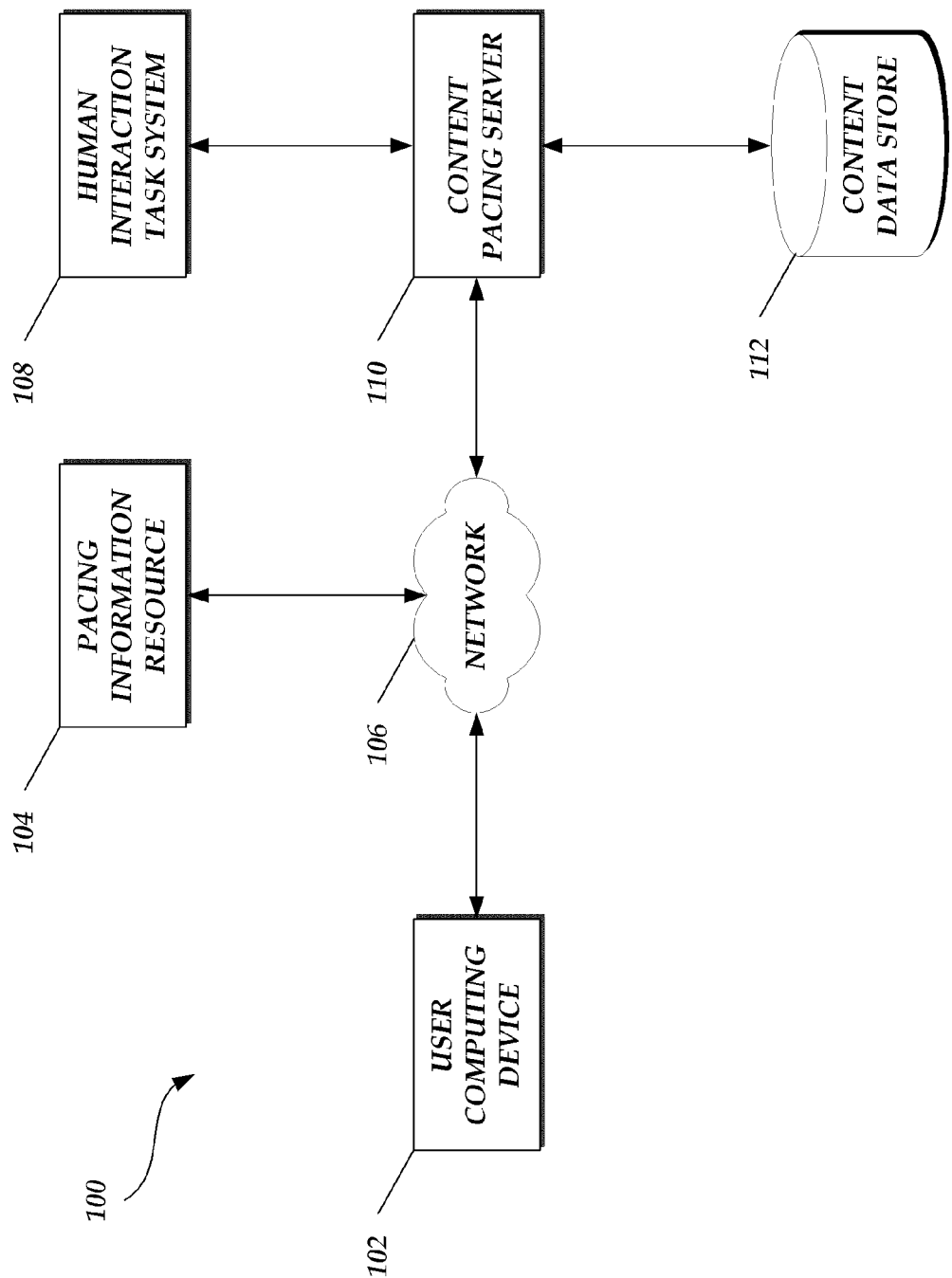
FIG. 1 is a schematic block diagram depicting an illustrative network environment.

Generally described, aspects of the present disclosure relate to selecting and adjusting the speed at which content is conveyed to a user. Accordingly, a content pacing service is disclosed. The speed at which content is conveyed is sometimes referred to herein as a "convey rate." The content pacing service may determine the duration of a portion of an item of content conveyed at a base convey rate, such as at its original 1× convey rate, or a rate at which it is currently being conveyed to a user This duration is sometimes referred to herein as a "base duration." The content pacing service may also determine how much time the user has to consume content, sometimes referred to herein as a "convey duration." Accordingly, the content pacing service may generate or determine a convey rate at which a portion of the item of content may be conveyed such that the portion is conveyed substantially within the convey duration.

In one embodiment, this convey rate is generated by dividing the base duration of the portion of the item of content by the convey duration. For example, a portion of the item of content may have a base duration of two hours and thirty minutes. The user may have two hours in which to consume the content, for a convey duration of two hours. Accordingly, the generated convey rate would be 1.25×: two hours and thirty minutes divided by two hours. The portion of the item of content may be conveyed at this increased rate or speed. Thus, the user may consume two hours and thirty minutes' worth of content in two hours by having the content conveyed at the increased generated convey rate.

For some users, it may be desirable to constrain the generated convey rate. For example, a user may wish to have a portion of an item of content conveyed neither too quickly nor too slowly. Accordingly, the generated convey rate may optionally be compared to a range of preferred convey rates. Generally described, a preferred convey rate may be a convey rate at which the user would appreciate the content, even if this rate is faster or slower than the 1× convey rate. Returning to the above example, the user may specify a range of preferred convey rates with a lower bound (e.g., a slowest preferred convey rate) and an upper bound (e.g., a fastest preferred convey rate). If the generated convey rate is not within the range of preferred convey rates, a different portion (such as a longer or shorter portion) of the item of content may be selected to be conveyed during the convey duration. A user may have a range of preferred convey rates for use with many items of content, or a user may set a range of preferred convey rates for particular types of items of content; for items of content with a common narrator, musician, or other performer; or for individual items of content. Preferred convey rate ranges may also be determined by gathering data across multiple users of the content pacing service to determine a popular or average convey rate range.

The convey duration may be specified by user input or determined by the content pacing service. In one embodiment, the user directly inputs the amount of time he or she has to consume content. In another embodiment, the user provides his or her location to the content pacing service along with a destination. The content pacing service may estimate a time of arrival based on the user's current position, speed, and the user's destination, and select a convey duration accordingly. The convey duration (and, in some cases, the convey rate and/or the selection of the portion of the item of content) may be adjusted automatically based on traffic conditions or weather conditions that may affect the user's estimated time of arrival. The content pacing service may also store destinations for future use.

In some embodiments, reference points in the item of content are used to guide the selection of portions of items of content to be conveyed, so that the conveyed content reaches a "stopping point" at or near the end of the convey duration. These reference points may vary based on the type of the item of content. For example, say that item of content is a television program. Reference points in the television program may include, for example, commercial breaks or scene changes. In another example, the item of content may be a musical work that spans many different movements, such as Mahler's Ninth Symphony, which has four movements. Reference points in the musical work may fall between each of the movements. Still other reference points are possible. For example, reference points may be timestamps in the item of content. They may also represent changes in sentences, paragraphs, or chapters of items of content. Accordingly, in some embodiments, the portion of the item of content to be conveyed during the convey duration falls between a user's position in the item of content and a reference point. In other embodiments, the portion of the item of content to be conveyed during the convey duration falls between two reference points in the item of content. In still other embodiments, the portion of the item of content to be conveyed during the convey duration is the entire item of content. For example, the end of the item of content may be treated as a reference point.

The content pacing service may also recommend content to a user to be conveyed during a particular convey duration. For example, the user may indicate to the content pacing service that he or she has two hours in which to consume content. Accordingly, the content pacing service may select one or more portions of one or more items of content to the user that may be conveyed at a preferred convey rate during the convey duration. The portions may be conveyed at the same convey rate or at different convey rates. For example, the content pacing service may recommend a portion of a first item of content with a base duration of one hour and forty minutes, and another portion of a second item of content with a base duration of one hour. The content pacing service may convey the portion of the first item of content at a 1.25× convey rate (in one hour and twenty minutes) and the portion of the second item of content at a 1.33× convey rate (in forty minutes) for a total of two hours. The content pacing service may also recommend portions of items of content based on user preferences about the content to be recommended (e.g., for a particular type of item of content, like audiobooks or television episodes) or based on items of content related to those owned by the user (e.g., by sharing a common series, author, or genre).

Turning to FIG. 1, an illustrative network environment 100 is shown. The network environment 100 may include a user computing device 102, a pacing information resource 104, a network 106, a human interaction task system 108, a content pacing server 110, and a content data store 112. The constituents of the network environment 100 may be in communication with each other either locally or over the network 106.

The user computing device 102 may be any computing device capable of communicating over the network 106, such as a laptop or tablet computer, personal computer, personal digital assistant (PDA), hybrid PDA/mobile phone, mobile phone, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The user computing device 102 may communicate over the network 106, for example, to obtain pacing information from the pacing information resource 104 or to request recommendations for items of content from the content pacing server 110.

The user computing device 102 may generally be capable of conveying content to a user of the user computing device 102. For example, the user computing device 102 may be capable of playing audio content by directing audible output through speakers, headphones, or the like. The user computing device 102 may also be capable of displaying images or video content on a display screen. Additionally, the user computing device 102 may be capable of conveying content at variable convey rates. For example, the user computing device 102 may convey a portion of an item of content faster or slower than a 1× convey rate, or at a uniform or non-uniform convey rate. The user computing device may further be capable of adjusting the pitch of an item of content that includes audio content. For example, if the audio content is conveyed at a faster rate, the pitch of the audio content may be lowered. If the audio content is conveyed at a slower rate, the pitch of the audio content may be raised.

The user may specify a range of preferred convey rates through the user computing device 102. For example, the user may specify his or her minimum (e.g., slowest) and maximum (e.g., fastest) preferred convey rates through a user interface displayed by the user computing device 102. The content pacing service may provide the user interface a software application or content page hosted by the content pacing server 110 and accessed through a network resource browser on the user computing device 102. The content pacing service may also determine a user's slowest and fastest preferred convey rates by analyzing how the user reacts to content conveyed at a particular rate, e.g., by choosing a slower convey rate for content conveyed too quickly, or a faster convey rate for content conveyed too slowly.

The user computing device 102 may also operate to obtain a convey duration during which content may be conveyed by the user computing device 102. In some embodiments, the user computing device 102 may present a user interface to a user of the user computing device 102 through which the user may specify the convey duration. In other embodiments, the user computing device 102 may obtain a convey duration automatically. For example, the user may specify a destination to which he or she is traveling with the user computing device 102. Accordingly, the user computing device 102 may obtain information from the pacing information resource 104 to compute an estimated time of arrival at the destination specified by the user. This estimated time of arrival may in turn be used to determine the convey duration. The user computing device 102 may also determine a convey duration based on an estimated remaining time of operation of the user computing device 102, which may be based on, for example, the remaining battery life of the user computing device 102. For example, if the user computing device has only forty-five minutes of battery life remaining, the convey duration may be set at forty-five minutes or fewer.

In some embodiments, the user computing device 102 also stores one or more items of content in an electronic data store. For example, the user computing device 102 may include one or more hard disk drives, solid state memories, and/or any other type of non-transitory computer-readable storage medium accessible to or integrated within the user computing device 102. These items may be retrieved from storage and conveyed by the user computing device 102.

The pacing information resource 104 may generally include one or more computerized systems that provide information about pacing so that items of content may be conveyed at an appropriate rate. This information may be accessed over the network 106 by the user computing device 102 or the content pacing server 110.

In some embodiments, the pacing information resource 104 stores information about the base duration of one or more portions of one or more items of content. For example, the pacing information resource 104 may include a list of running times for scenes of movies or entire movies, or song lengths for one or more musical albums or compilations. The pacing information resource 104 may also store information about the locations of one or more reference points in items of content. For example, the pacing information resource may maintain timestamp information to determine where one or more commercial break reference points may fall in an episode of a television show, or where one or more chapter change reference points in an audiobook (e.g., the point at which one chapter ends and another begins).

The pacing information resource 104 may also have access to geographical information relevant to the operation of the content pacing service. For example, in some embodiments, the pacing information resource 104 may include a network-based mapping service or a global positioning system (GPS) service. The user computing device 102 may transmit its destination to the pacing information resource 104, which in turn may determine the location and speed of the user computing device 102. The pacing information resource 104 may transmit this location and speed information back to the user computing device 102, which may then compute a convey duration based its location, speed, destination, and estimated time of arrival at the destination.

The pacing information resource 104 may also include a travel information service (e.g., flight information or train schedules), traffic information service and/or meteorological information service. Information from these services may be used to adjust the convey duration. For example, the pacing information resource 104 may determine that a traffic jam has occurred between the location of the user computing device 102 and the destination specified by the user. Accordingly, information about the traffic jam may be transmitted over the network 106 from the pacing information resource 104 to the user computing device 102, which may then increase the convey duration.

The network 106 may be any wired network, wireless network, or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

A human interaction task system 108 may be included in the network environment to assist the content pacing server 110. Generally described, the human interaction task system 108 is a computerized system that electronically processes human interaction tasks (HITs). A HIT may be a difficult, time-consuming, or expensive task for a computing device to perform. However, it might be relatively easy and quick for a human to perform a HIT. Accordingly, the human interaction task system 108 might request a human worker to perform a HIT, e.g., for gathering information or answering a query, and to return the results or answers to the human interaction task system 108 for further processing and/or presentation to the requestor. Thus, in some embodiments, the content pacing service directs the human interaction task system 108 to pose one or more queries about an item of content to a human worker of the human interaction task system 108. For example, a human worker may be asked to determine the duration of an item of content, to determine one or more reference points in an item of content, or to determine a range of convey rates at which content may be conveyed such that a user of the item of content would appreciate the content. The human interaction task system 108 may receive answers to these queries and transmit them to the user computing device 102 or the content pacing server 110 to guide the operation of the content pacing service. The human worker of the human interaction task system 108 may volunteer to respond to these and other tasks and to communicate other information about items of content and the pacing thereof to the content pacing server 110.

The content pacing server 110 is a computing device that may perform a variety of operations to implement the content pacing service. For example, the content pacing server 110 may store information about a user's preferred convey rates; recommend items of content based on a user's preferred convey rates and convey duration; transmit items of content or portions of item of content from the content data store 112 over the network 106 to the user computing device 102; and other operations. Additional operations of the content pacing server 110 are described below with respect to FIG. 2.

The content pacing server 110 may be in communication with a content data store 112. The content data store 112 may electronically store items of content, such as audiobooks, musical works, electronic books, television programs, video clips, movies, multimedia content, video games, and other types of content. The content data store 112 may also maintain information about the base duration of the items of content that it stores, as well as information about the genre of each item of content; an author or director of each item of content; the subject of each item of content; and other information about the content. The content data store 112 may be embodied in hard disk drives, solid state memories, and/or any other type of non-transitory computer-readable storage medium accessible to the content pacing server 110. The content data store 112 may also be distributed or partitioned across multiple storage devices as is known in the art without departing from the spirit and scope of the present disclosure.

The user computing device 102 and content pacing server 110 may each be embodied in a plurality of components, each executing an instance of the respective content user computing device 102 and content pacing server 110. A server or other computing system implementing the user computing device 102 and content pacing server 110 may include a network interface, memory, processing unit, and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and content pacing server 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the content pacing server 110 may be represented in a single physical server or, alternatively, may be split into multiple physical servers. The content pacing server 110 and the pacing information resource 104 may be combined. The entire content pacing service may be represented in a single user computing device 102 as well.

Additionally, it should be noted that in some embodiments, the content pacing service may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
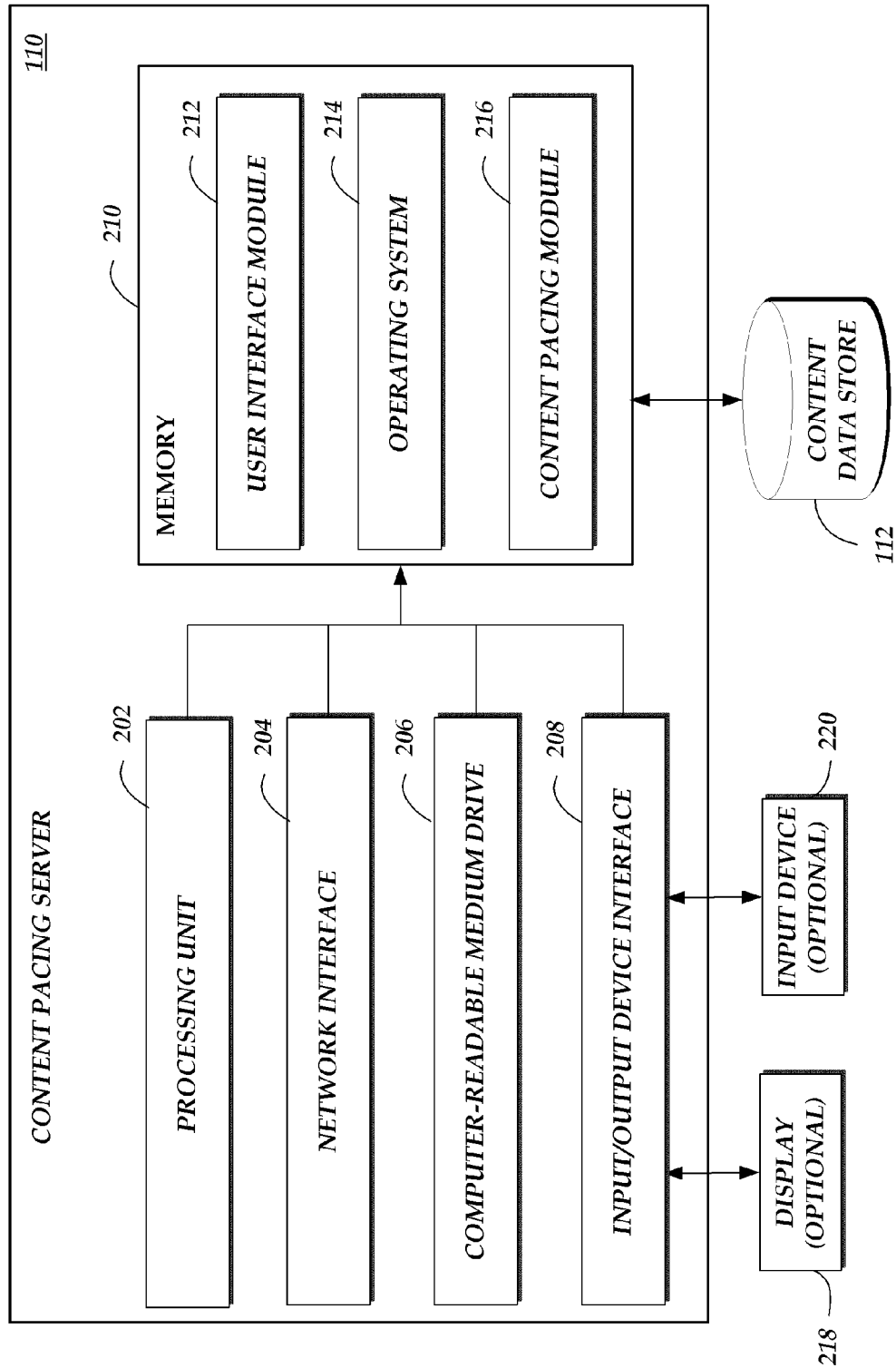
FIG. 2 is a schematic block diagram depicting an illustrative content pacing server of the network environment depicted in FIG. 1.

FIG. 2 is a schematic diagram of the content pacing server 110 shown in FIG. 1. The content pacing server 110 includes an arrangement of computer hardware and software components that may be used to implement the content pacing service. FIG. 2 depicts a general architecture of the content pacing server 110 illustrated in FIG. 1. Those skilled in the art will appreciate that the content pacing server 110 may include more (or fewer) components than those shown in FIG. 2. It is not necessary, however, that all of these generally conventional components be shown in order to provide an enabling disclosure.

The content pacing server 110 includes a processing unit 202, a network interface 204, a non-transitory computer-readable medium drive 206, and an input/output device interface 208, all of which may communicate with one another by way of a communication bus. As illustrated, content pacing server 110 is optionally associated with, or in communication with, an optional display 218 and an optional input device 220. The display 218 and input device 220 may be used in embodiments in which users interact directly with the content pacing server 110, such as an integrated in-store kiosk or integrated component for inclusion in an automobile, boat, train, or airplane, for example. In other embodiments, the display 218 and input device 220 may be included in the user computing device 102 shown in FIG. 1. The network interface 204 may provide content pacing server 110 with connectivity to one or more networks or computing systems. The processing unit 202 may thus receive information and instructions from other computing systems (such as the user computing device 102 or the pacing information resource 104) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the content pacing service. The memory 210 generally includes RAM, ROM and/or other persistent or non-transitory computer-readable storage media. The memory 210 may store an operating system 214 that provides computer program instructions for use by the processing unit 202 in the general administration and operation of the content pacing server 110. The memory 210 may further include other information for implementing aspects of the content pacing service. For example, in one embodiment, the memory 210 includes a user interface module 212 that facilitates generation of user interfaces (such as by providing instructions therefor) for display upon a computing device such as the user computing device 102. For example, a user interface may be displayed via a navigation interface such as a web browser installed on the user computing device 102. In addition, memory 210 may include or communicate with the content data store 112. Content stored in the content data store 112 may include various types of items of content as described in FIG. 1.

In addition to the user interface module 212, the memory 210 may include a content pacing module 216 that may be executed by the processing unit 202. In one embodiment, the content pacing module 216 implements the content pacing service. For example, the content pacing module 216 may be used to identify reference points in an item of content; compute convey durations; compute convey rates; recommend one or more portions of one or more items of content to be conveyed during a convey duration; receive information about reference points generated by the human interaction task system 108; identify one or more items of content stored on the user computing device 102; obtain information from the pacing information resource 104; and perform other tasks. Example routines that may be undertaken by the content pacing module 216 are disclosed in FIG. 3, FIG. 4, and FIG. 5.

In some embodiments, the content pacing service is implemented partially or entirely by the user computing device 102. Accordingly, the user computing device 102 may include a content pacing module 216 and other components that operate similarly to the components illustrated as part of the content pacing server 110, including a processing unit 202, network interface 204, non-transitory computer-readable medium drive 206, input/output interface 208, memory 210, user interface module 212, and so forth.

Figure 3:
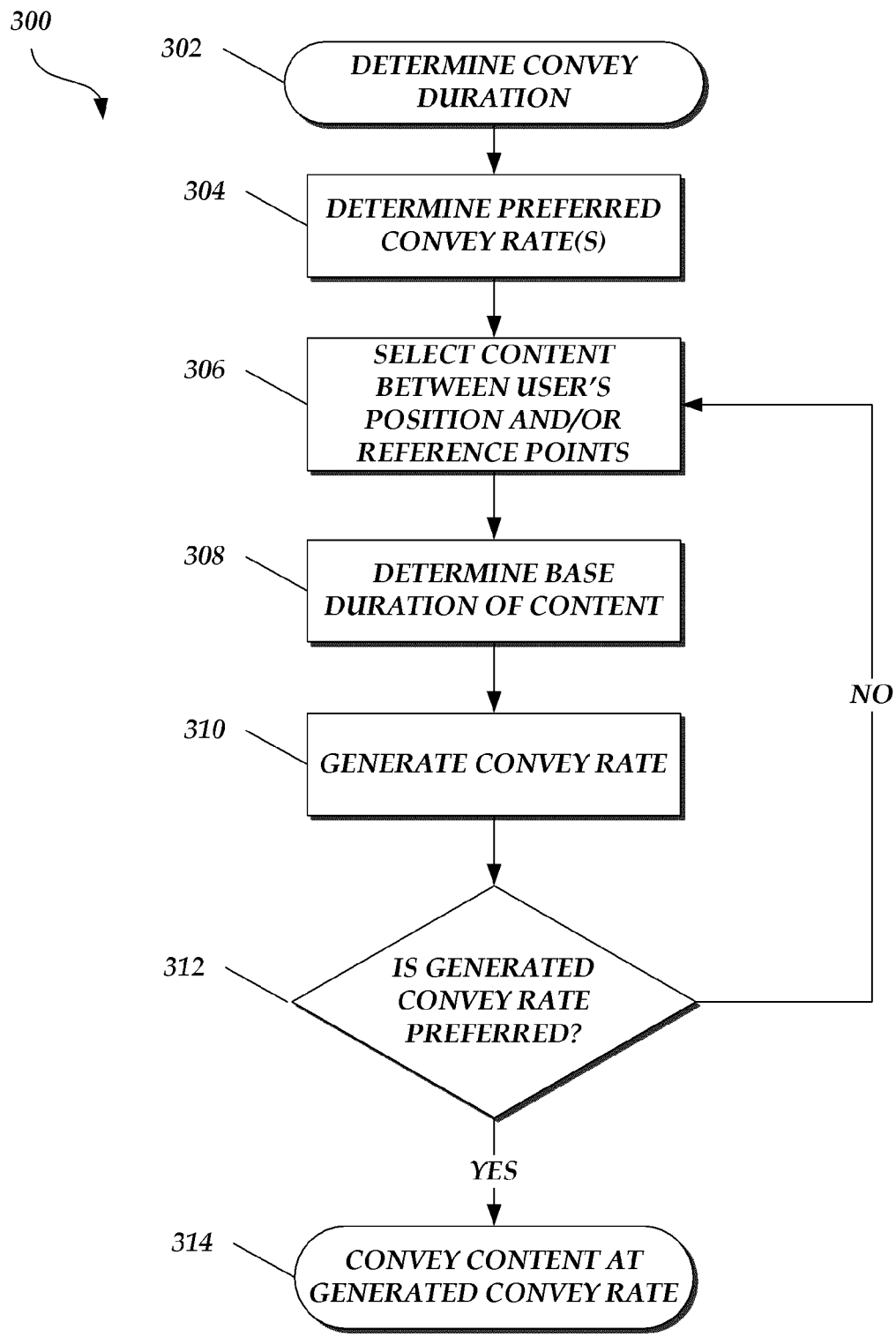
FIG. 3 is a flow diagram depicting an illustrative routine for pacing one or more portions of one or more items of content.

FIG. 3 depicts an illustrative routine 300 for selecting portions of items of content to be conveyed at a generated convey rate. A generated convey rate may be faster than a 1× convey rate, slower than a 1× convey rate, or substantially equal to a 1× convey rate. In block 302, the content pacing service may determine the convey duration during which a portion of the item of content will be conveyed. The length of the convey duration may be determined in a number of ways. In some embodiments, a convey duration is specified by user input. For example, the user, by interacting with a user interface provided with the content pacing service, may specify a particular time during which the user is available to consume the content. In other embodiments, the convey duration is determined at least in part from information obtained from a pacing information resource as shown in FIG. 1. For example, the user may input a destination to which he or she is traveling. The content pacing service may, based on the user's location and speed as determined by a network-based mapping service or a global positioning system (GPS) service, calculate the user's estimated time of arrival, determine the difference between the user's estimated time of arrival and the current time, and set that difference as the convey duration. Alternately, the content pacing service may include an offset to the difference between the estimated time of arrival and the current time to determine a convey duration. For example, the content pacing service may reduce the convey duration if the user is on a flight to reflect the fact that a user may be required to turn off his or her user computing device during the flight. Other methods for determining the convey duration are possible.

It should be noted that a convey duration need not be contiguous, e.g., the convey duration may be one contiguous duration (e.g., a three-hour block) or multiple subdurations whose total duration adds up to the convey duration (e.g., instead of a three-hour block, four forty-five minute blocks). For example, the user may indicate that he or she has a convey duration of five hours over the course of a workweek: half an hour's commute going into work, and half an hour's commute home, Monday through Friday. The convey duration may accordingly be broken down into ten subdurations of thirty minutes each. Alternately, the user may input how many how many subdurations of a given length he or she has available to consume content. The sum of the subdurations may be used to compute a convey duration. Returning to the above example, a user may indicate that he or she has a thirty-minute commute, ten times a week. Accordingly, the ten thirty-minute subdurations may be added so that the convey duration comes out to five hours.

In block 304, the content pacing service may determine the preferred convey rates of the user. In some embodiments, the preferred convey rates form a range of convey rates. For example, a range between a 0.5× convey rate (e.g., half as fast as a standard 1× convey rate) and a 1.5× convey rate (e.g., half again as fast as a standard 1× convey rate). This range may be specified in a number of ways. For example, in some embodiments, the user specifies their slowest and fastest preferred convey rates by interacting with a user interface. In other embodiments, the content pacing service may analyze how a user adjusts the convey rate of items of content conveyed by the user computing device. For example, say that the user computing device is conveying content at a 1.5× convey rate. In response to the user computing device conveying the content at the 1.5× convey rate, the user may deem that the content is being conveyed too quickly, and may slow down the convey rate of the content by providing user input to his or her user computing device. Accordingly, the reduced convey rate set by the user may be stored by the content pacing service and used to set the bounds of the preferred convey rate range.

In some embodiments, the user is acclimated to faster or slower convey rates automatically by the content pacing service. For example, items of content and portions thereof may be conveyed at faster and faster (or slower and slower) rates until the user reacts to slow down (or speed up) the rate at which the content is conveyed, or to stop the acceleration (or deceleration) of the content. The fastest (or slowest) convey rate reached immediately before the user reacted may be used as the fastest preferred convey rate.

In some embodiments, an electronic book or other textual item of content may be conveyed synchronously with an item of audio content of the same title. For example, a user may read an electronic book version of the Voltaire's novel Candide while listening to an audiobook of Candide. The audiobook may be synchronized with the electronic book, so that the user's reading rate (e.g., as measured in words or pages consumed by the user per unit time) may be used to set a preferred convey rate for the audiobook, so that the audiobook tracks the user's progress through the electronic book. Quicker readers may prefer that the audiobook conveyed to them at a relatively fast convey rate to maintain synchronization, for example. Example methods for synchronizing an item of textual content with a companion item of audio content are disclosed in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." The disclosures of both of these applications are hereby incorporated by reference in their entirety.

Other ways for determining preferred convey rates are possible. For example, preferred convey rates may be determined by averaging preferred convey rates selected by multiple users of the content pacing service. In another example, the content pacing service may maintain information on user's past selections of convey rates and use those past selections to determine preferred convey rates for a subsequently conveyed item of content. Additionally, it should be noted that a range of preferred convey rates need not include a 1× convey rate. For example, a user may have a range of preferred convey rates between 1.2× and 1.5×, or between 0.7× and 0.9×.

In some instances, a user may have preferred convey rates that vary by the type of item of content to be conveyed. For example, the user may have a relatively broad preferred convey rate for audiobooks, indicating that the user may tolerate significant increases or decreases the speed at which an audiobook is conveyed. On the other hand, the user may have a preferred convey rate of substantially 1× for musical items of content, indicating that the user wishes to hear music at its original convey rate, without acceleration or deceleration. In other instances, a user's preferred convey rates may vary by a performer (e.g., an actor, narrator, singer, musician, musical group, etc.) of the content to be conveyed. For example, a user may have a relatively high fastest preferred convey rate for a narrator of an audiobook who speaks very slowly when the audiobook is conveyed at a 1× convey rate. This may reflect that the user can understand and appreciate the audiobook even if the narrator's speech is sped up significantly.

In block 306, the content pacing service may analyze one or more portions of the item of content to determine which portion of the item of content should be conveyed, and select a portion of the item of content accordingly. In some embodiments, the selected portion is between the user's position in the content (e.g., as tracked by a timestamp, electronic bookmark, or other indicator) and a reference point in the content. In other embodiments, the selected portion of the item of content is between two reference points in the item of content.

As discussed above, reference points may vary based on the type of item of content. For example, reference points in audiobooks or electronic books may include the beginning or end of a sentence, paragraph, or chapter of the audiobook. Reference points in a musical work may include the beginning or end of a verse, movement, track, or song. Reference points in video content, such as television episodes or movies, may include scene changes, commercial breaks, intermissions, or the beginning or end of a chapter.

The content pacing service may identify reference points using automated techniques, manual techniques, or a combination of the two. In one embodiment, the content pacing service identifies reference points by using labels or other markup that may be embedded in or included with the item of content. For example, the beginnings or ends of chapters may be labeled as reference points in an audiobook. Reference points may be provided by the author or publisher of an item of content, or may be identified by a human worker of a human interaction task system. For example, a portion of an item of content may be conveyed to a human worker of the human interaction task system, along with the question, "Please identify any reference points in this portion of an item of content." The human worker may identify any reference points present, and the results may be routed to the content pacing service.

In another embodiment, the content pacing service analyzes the content to identify reference points. For example, the content pacing service may analyze the volume of an item of audio content over the duration of the audio content. A position in the item of audio content at which the volume of the item of audio content is substantially equal to zero (e.g., there is no audio or silent audio), which may represent a break between verses, songs, or movements in the item of content, may be identified as a reference point.

In another example, the content pacing service may synchronize an item of audio content with an item of textual content, such as synchronizing an audiobook with a companion electronic book. The content pacing service may perform syntactic analysis to find reference points in the electronic book, e.g., by analyzing punctuation or spacing to identify reference points corresponding to the beginnings or ends of sentences, paragraphs, chapters, etc. Example methods for synchronizing an item of textual content with a companion item of audio content are disclosed in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." The disclosures of both of these applications were previously incorporated by reference above.

In still another example, the content pacing service may perform image analysis on video content to locate a position in the item of video content at which the video content is substantially dark or empty, which may indicate a transition between scenes. For instance, a television program may include one or more dark frames between scenes. These frames may accordingly be marked as a reference point. Still other ways to identify reference points in an item of content are possible.

In block 308, the content pacing service may determine the base duration of the portion of the item of content selected in block 306. This information may be obtained, for example, by accessing information about the item of content from the pacing information resource, from the content pacing server, or the user computing device. In some embodiments, the item of content itself may indicate the length of a portion of the item of content selected. For example, the item of content may have one or more timestamps. Still other methods for determining the base duration of a portion of an item of content are possible.

In block 310, the convey rate for this item of content may be generated. In some embodiments, the generated convey rate is obtained by dividing the base duration of a selected portion of the item of content by the convey duration. For example, if a selected portion of the item of content lasts two hours and thirty minutes and the convey duration is two hours, the generated convey rate may be a 1.25× convey rate, so that two and a half hours' worth of content may be conveyed in two hours at this faster-than-base convey rate. Other methods for calculating the convey rate are possible. Additionally, it should be appreciated that the generated convey rate may take into account offsets to the convey duration, as discussed above with respect to block 302. For example, the content pacing service may account for periods of time in which users may be required to turn off their user computing device for example when a user is on a flight. In such a case it may be preferable to increase the convey rate obtained by dividing the base duration of the portion of the item of content by the convey duration.

In block 312, the generated convey rate may be compared to one or more preferred convey rates to determine if the generated convey rate is a preferred convey rate. For example, the generated convey rate may be compared to a range of preferred convey rates. If the generated convey rate falls substantially within the range of preferred convey rates, it may be deemed a preferred convey rate.

If the content and convey rate as determined in block 312 is not preferred, a different portion of the item of content may be selected. For example, a different reference point may be selected in the item of content relative to the user's position or a different pair of reference points that delineate a portion of the item of content may be selected. Blocks 306, 308, and 310 may optionally be repeated or iterated until a portion of an item of content is selected such that the generated convey rate for that portion is a preferred convey rate. In some instances, a portion selected in one iteration may include a portion selected in a different iteration. In other instances, a portion selected in one iteration may be included in a portion selected in a different iteration.

If the generated convey rate is determined to be a preferred convey rate in block 312, then the portion of the item of content selected in block 306 may be conveyed at the generated convey rate, as shown in block 314. As discussed above, the generated convey rate may be slower or faster than the base 1× convey rate of the portion of the item of content. In some embodiments, the content is modulated to account for changes that may occur in the content from conveying it at a faster or slower convey rate. For example, audio content often increases in pitch when conveyed at a rate faster than a 1× convey rate, but often falls in pitch when conveyed at a rate slower than a 1× convey rate. Accordingly, for audio content, pitch correction may be applied so as not to alter the pitch of the content. For audio content being conveyed at a convey rate faster than a 1× convey rate, the pitch of the audio content may be lowered. Alternately, for content being conveyed at slower than a 1× convey rate, the pitch of the audio content may be raised instead.

It should be appreciated that the content need not be conveyed at a uniform convey rate so long as the average convey rate is substantially equal to the generated convey rate. For example, it may be advantageous to slowly accelerate the convey rate so as to produce a seamless experience for the user of the item of content. For example, a user listening to an audio book may have two hours to listen to the audio book. The audio book may last two and a half hours. Accordingly, the average generated convey rate would be approximately 1.25×. The audio book may be conveyed at smoothly increasing or terraced convey rates up to the user's fastest preferred convey rate. For example, say that the user's fastest preferred convey rate is a 1.5× convey rate. Accordingly, the content pacing service may terrace the increase in convey rates such that some of the portion of the audiobook is conveyed at a 1× convey rate, some of the portion of the audiobook is conveyed at a 1.1× convey rate, some of the portion of the audiobook is conveyed at a 1.1× convey rate, and so on until reaching the fastest preferred convey rate of 1.5×. In other embodiments, content is conveyed at a uniform convey rate substantially equal to the generated convey rate. Accordingly, returning to the above example, the audiobook may be conveyed at a uniform convey rate of 1.25×.

Figure 4:
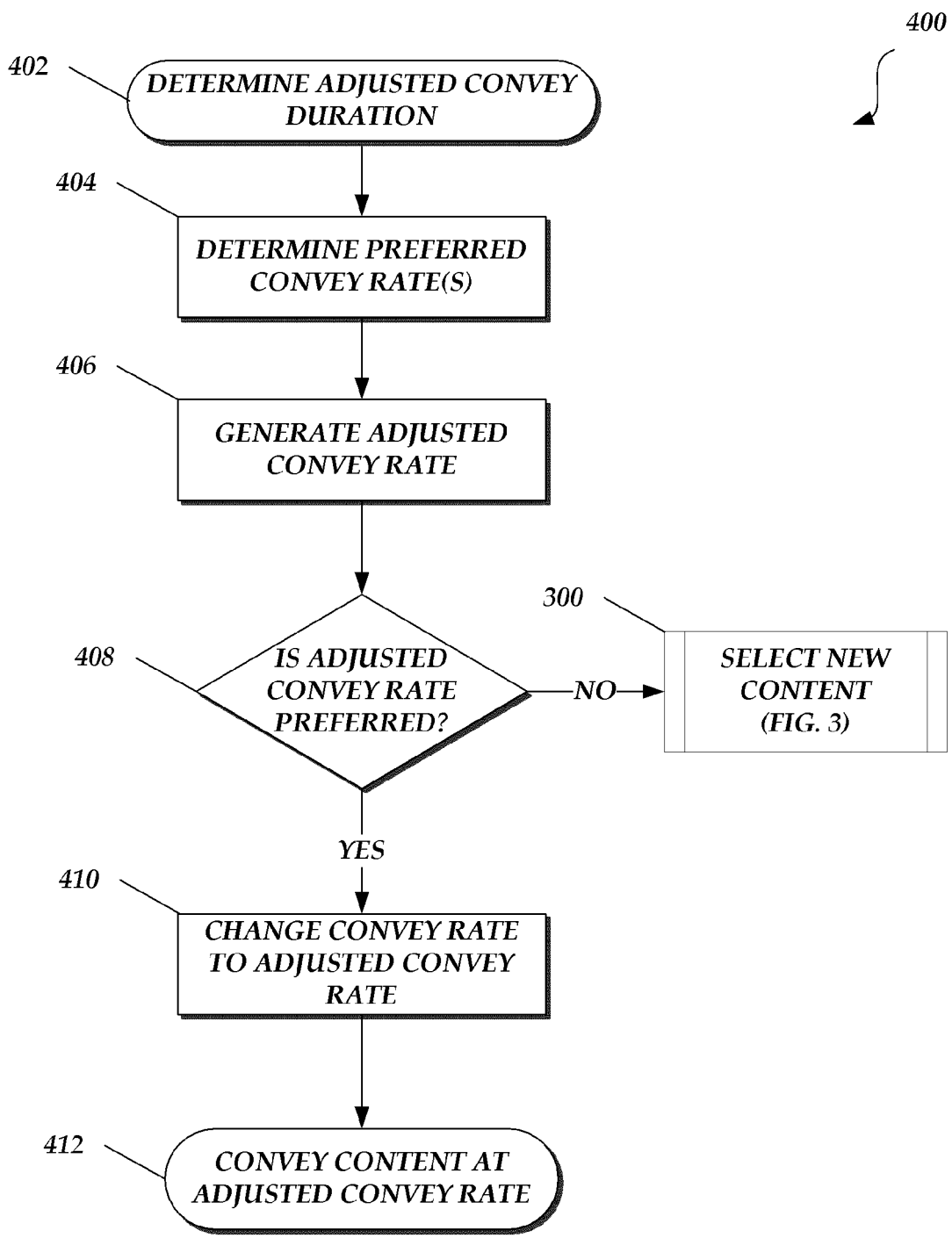
FIG. 4 is a flow diagram depicting an illustrative routine for adjusting the rate at which content is conveyed.

FIG. 4 depicts an illustrated routine 400 for making adjustments to convey rates based on adjustment to convey duration. In block 402, the content pacing service may determine an adjusted convey duration. As discussed above, a convey duration may be adjusted based on user input, based on information obtained from a pacing information resource, based on information received from a content pacing server, or based on information obtained by the user computing device. In one example, the user may input an adjusted convey duration. For example, the user may have believed that he or she had two hours to consume a portion of the item of content. It turns out the user may have more or less time. The user may input this adjustment through a user interface provided by the content pacing service and displayed on his or her user computing device. In another example, a convey duration may be adjusted based on information obtained by a pacing information resource and provided to the user computing device. For example, say that a user is listening to an audiobook while driving. The user has set a destination and the convey duration has been estimated based on the user's estimated time of arrival at the destination. The content pacing service may determine based on information received from the pacing information resource that there is a traffic jam between the user's current location and the user's destination. Accordingly, the user's convey duration may be increased to reflect that it will likely take the user longer to reach his or her destination. For example, the convey rate may be decreased or slowed down to account for the longer travel time. Still other ways to determine an adjusted convey duration are possible.

In block 404, the user's preferred convey rates may be determined substantially as discussed above with respect to block 304 in FIG. 3. For example, the user may specify a range of preferred convey rates which may include a lower bound and an upper bound corresponding to the slowest preferred convey rate and the fastest preferred convey rate.

In block 406, the content pacing service may generate an adjusted convey rate based on the adjusted convey duration, substantially as discussed above with respect to block 306 of FIG. 3. For example, the adjusted convey rate may generated by determining the base duration of the portion of the item of content being conveyed, and dividing that base duration by the adjusted convey duration.

In block 408, the content pacing service may determine if the adjusted convey rate is a preferred convey rate. For example, the previous convey rate as generated during illustrated routine 300 in FIG. 3 may have been within a range of preferred convey rates. However, the adjusted convey rate may or may not be within the range of preferred convey rates.

If the generated adjusted convey rate as determined in block 408 is not a preferred convey rate, then a new portion or different portion of the item of content may be selected to be conveyed during the adjusted convey duration. This portion may be selected substantially as discussed above with respect to FIG. 3 and illustrated routine 300. Returning to the above example of the user stuck in a traffic jam, the content pacing service may previously have only selected one chapter of an audio book to convey during the convey duration. The content pacing service may determine if the traffic jam will roughly double the user's travel time. Accordingly, the generated convey rate of the chapter of the audio book over the doubled convey duration may be below the lower bound of the range of preferred convey rates. Accordingly, the content pacing service may add another chapter of the audiobook to be conveyed during the adjusted convey duration. The added chapter may increase the base duration of the portion of the audiobook to be conveyed during the convey duration, in turn increasing the generated convey rate.

However, if the adjusted generated convey rate is a preferred convey rate, the portion of the item of content may continue to be conveyed, albeit at the adjusted generated convey rate. The previous convey rate may be changed to the adjusted generated convey rate in block 410. This change may be an immediate change, for example, immediately changing the convey rate from 1× to 1.25×. Alternately, this may be a terraced change. For example, an example of a terraced change up to a 1.5× convey rate might entail increasing the convey rate from 1× to 1.1× and so on until a 1.5× convey rate is reached. In another example, the convey rate may be changed smoothly. For example, the convey rate may be slowed down in a sliding fashion from 1× to 0.75× over a set duration. Once the adjusted convey rate has been reached, the content may be conveyed at the adjusted convey rate in block 412. Pitch correction as discussed above may also be applied.

Figure 5:
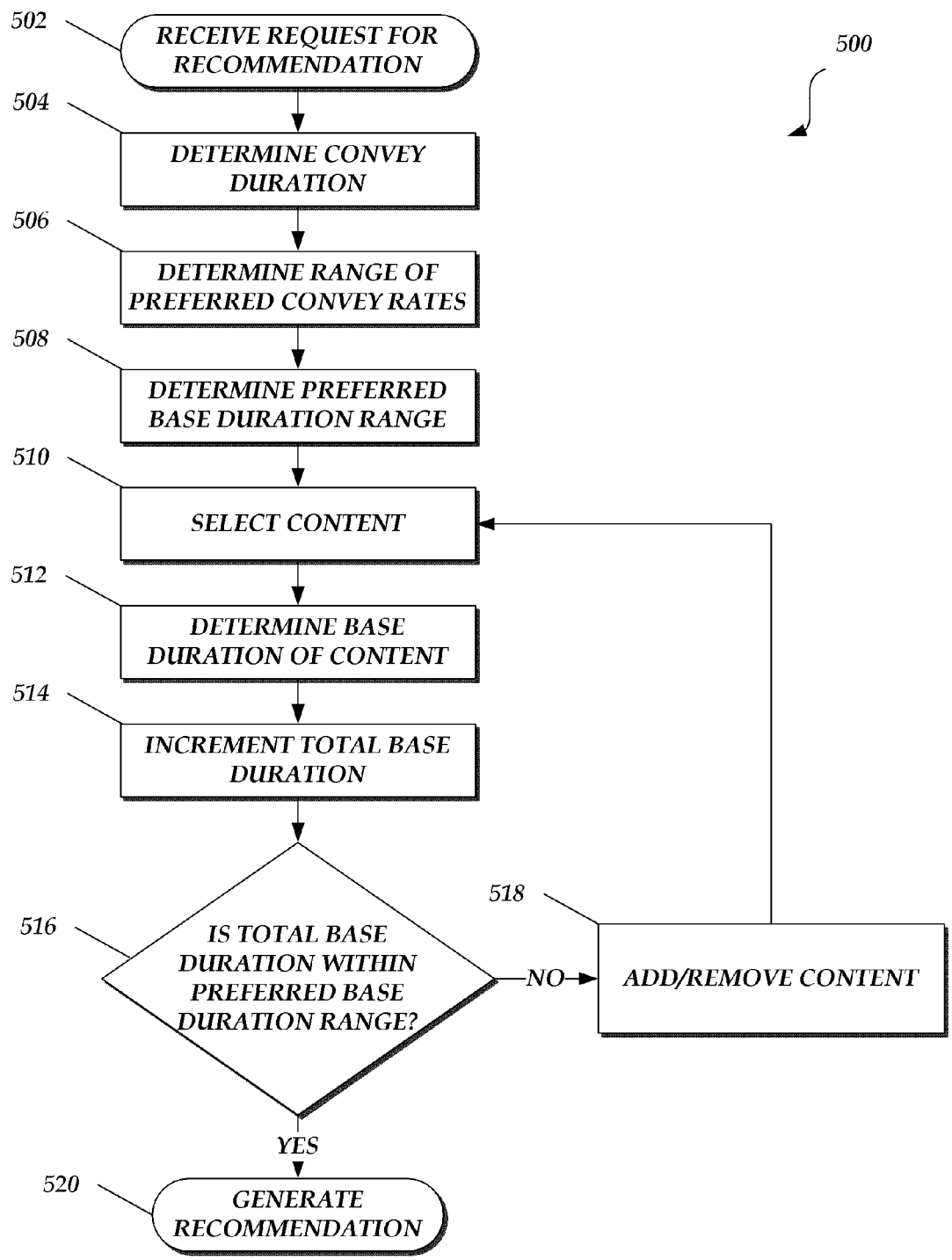
FIG. 5 is a flow diagram depicting an illustrative routine for recommending one or more portions of one or more items of content to be conveyed within a convey duration.

FIG. 5 depicts an illustrated routine 500 for recommending one or more portions of one or more items of content to be conveyed during a set base duration. For example, a user may specify a duration and request that the content pacing service recommend one or more portions of one or more items of content to be conveyed at a preferred convey rate during the convey duration specified by the user. For example, the user may be about to embark on a train ride of two hours. Accordingly, the user may request a recommendation from the content pacing service in block 502 for one or more portions of one or more items of content to be conveyed during the convey duration as determined in block 504.

The request for a recommendation may include a request for specific types of content. For example, the user may only be interested in audiobooks or only interested in television programs. In some embodiments, the user specifies types of portions of items of content to be recommended. For example, the user may prefer to only consume whole chapters of audiobooks or entire episodes of television programs. In other embodiments, the user requests recommendations for items of content that are similar to those stored on his or her user computing device or otherwise affiliated with him or her. For example, the content pacing service may compare content associated with the user to content stored in the content data store associated with content pacing server, for example, to identify and recommend content with a common author, a common narrator, a common artist, a common director, a common series, a common genre, or a common subject.

In block 506, a range of the user's preferred convey rates may be determined, substantially as discussed above with respect to block 304 in FIG. 3. This range of preferred convey rates may be used to compute a preferred base duration range in block 508. Generally described, a base duration range is a range of durations of portions of items of content that may be conveyed at a convey rate in the preferred convey rate range specified by the user. For example, the user may have two hours in which to consume content. The user's slowest preferred convey rate may be 0.5×. The user's fastest preferred convey rate may be 1.5×. Accordingly, the user's preferred base duration range may be between about one hour (0.5× times two hours) and about three hours (1.5× times two hours). Accordingly, the total of the base durations of the portions of the items of content selected during the illustrative content recommendation routine 500 may sum up to between about one hour and about three hours.

Selecting content to fill up a convey duration may be performed in a variety of ways. In some embodiments, a greedy algorithm is employed. When enough portions of items of content have been accumulated to provide a total base duration within the preferred base duration range, the content pacing service may generate a recommendation pertaining to the accumulated portions of items of content. This greedy algorithm may be implemented as an iterative routine.

Accordingly, in block 510, a portion of an item of content may be selected. As discussed above, preferably this portion is between two reference points in an item of content, or between the user's position and an item of content and a reference point in the item of content. In block 512, the base duration of the selected portion of the item of content may be determined. This base duration may be used to increment a total base duration in block 514. In block 516, the content pacing service may determine if the total base duration is within the preferred base duration range as determined in block 508. If the total base duration is not within the preferred base duration range, the content pacing service may add or remove previously selected portions of items of content in block 518.

For example, the user's base duration range may be from one hour to three hours. If a selected portion of the item of content has a base duration of only half an hour, the content pacing service select a larger portion of the item of content, or add another portion of the same or a different item of content, such that the total base duration is within the one hour to three hour base duration range. In another example, say that the content pacing service has selected a portion of an item of content that lasts four hours, whereas the user's preferred base duration range is between one hour and three hours. Accordingly, it may be preferable to remove the four hour base duration item of content from the recommendation.

If the total base duration for the one or more selected portions of the item of content falls under the total base duration, then the selected portions may be recommended in block 520. For example, a recommendation generated by the content pacing server may be transmitted from the content pacing server to the user computing device for display. Alternately, the user computing device may display a recommendation that it has generated on its own.

It will be recognized that a recommendation may also include one portion of one item of content, multiple portions of one item of content, or multiple portions of multiple items of content. For recommendations that include multiple portions of either one or multiple items of content, the content pacing service may optionally suggest a "playlist" or order in which the multiple portions of content should be conveyed. Additionally, for recommendations that comprise multiple portions of multiple items of content, the items of content and the portions thereof may be related, e.g., they may share a common author, a common performer, a common director, a common series, a common genre, common subject, etc.

Figure 6:
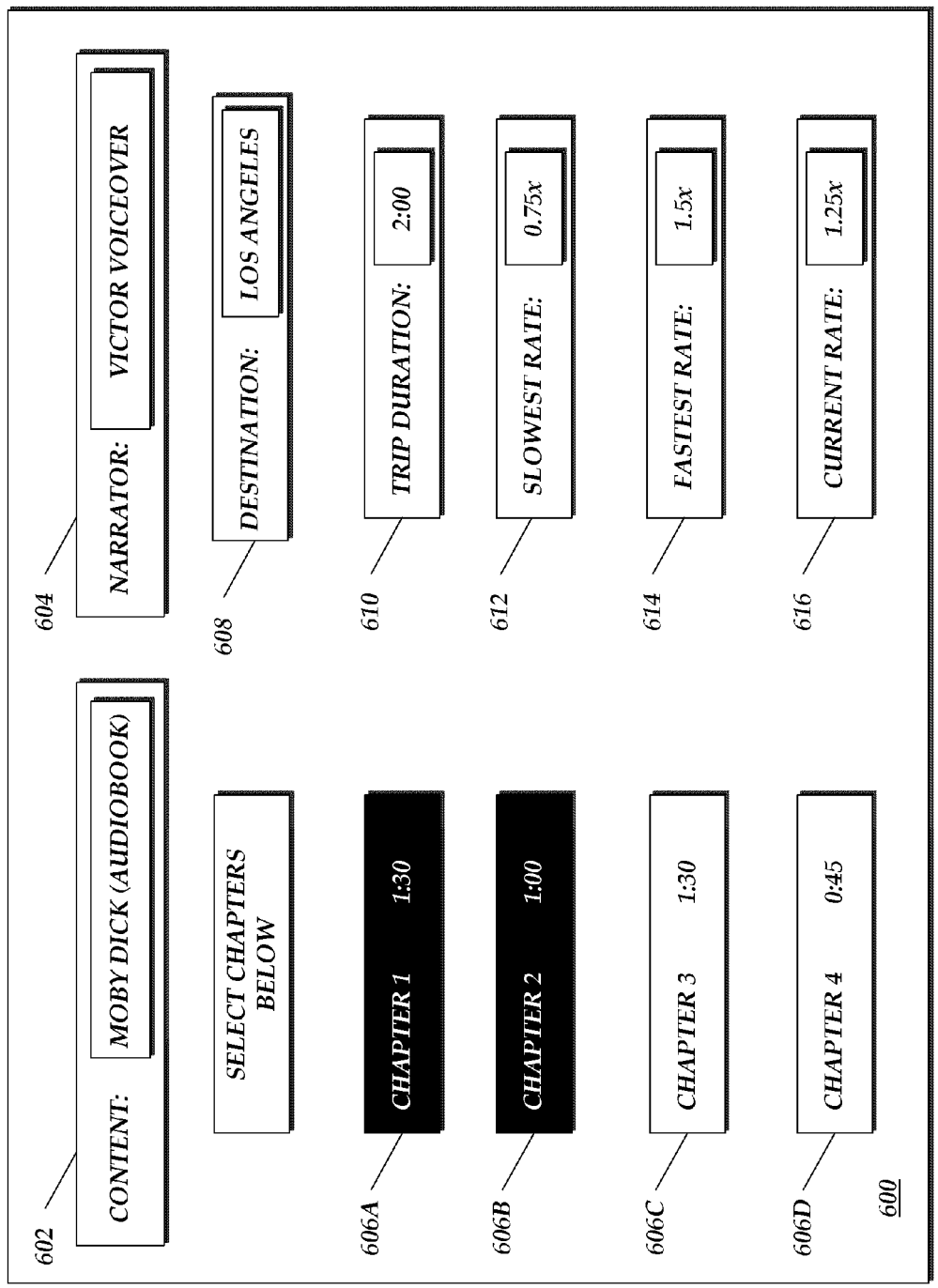
FIG. 6 is a pictorial diagram depicting an example user interface through which a user may specify which portions of an item of content should be conveyed during a convey duration.

FIG. 6 depicts an illustrative user interface 600 through which a user may specify a portion of an item of content to be conveyed during a particular convey duration. The user interface 600 may include a content element 602. The content element 602 may display to the user which item of content is to be conveyed. The user interface 600 may also include a performer element 604 if the item of content to be conveyed is associated with a particular performer, such as a narrator, musician or musical group, actor, etc. These elements may be included to guide the user if the user decides to specify convey rates through user input. For example, a user may wish to have a portion of an item of content conveyed slowly, so that he or she may savor that particular portion of the item of content. Alternately, the user may have an interest in getting through portions of the item of content very quickly and may increase the convey rate accordingly. For example, a user listening to a mystery audiobook may be interested in determining the resolution to the audio book relatively quickly. Accordingly, if the user may specify a relatively high maximum convey rate through user input.

The user may also wish to specify preferred convey rates based upon performer of the item of content as indicated in the performer element 604. For example, a particular narrator may naturally speak very quickly at a base convey rate of 1×. Accordingly, the user may have a relatively slow minimum preferred convey rate for items of content narrated by the particular narrator. The user may be able to slow down the narrator significantly and still understand the narration. On the other hand, if the narrator speaks relatively slowly at a base convey rate of 1×, the user may have a relatively fast maximum convey rate for that particular narrator, as that narrator may be sped up without the user missing any narration.

One or more portions of the item of content falling between one or more reference points and/or the user's position in a reference point in the item of content may be displayed in portion selection elements 606A-606D. For example, here, portion selection elements 606A-606D correspond to chapters of the audiobook "Moby Dick" as indicated in content element 602. The base durations of these portions may also be displayed in the portion selection elements 606A-606D. When a user selects one or more portions using the portion selection elements 606A-606D, the portion selection elements 606A-606D may be inverted, highlighted, bolded, underlined, italicized, or marked in some other way to indicated that the portion has been selected. The portions selected through portion selection elements 606A-606D may be used to determine a total base duration. Here, the total base duration for the selected portions is two hours and thirty minutes, as indicated by the sum of the base durations of selected portions 606A and 606B.

In destination element 608, the user may specify a destination to which he or she may be traveling. This destination may be used to estimate a convey duration which may be displayed in convey duration element 610. For example, the content pacing service may, using information provided by the user computing device and a pacing information resource, determine an estimated time of arrival for the user at his or her destination. A convey duration may be set accordingly, for example, by determining the difference between the estimated time of arrival and the current time. The user may also (or instead) specify a convey duration directly through convey duration element 610.

The user may specify preferred convey rates through the interface 600 as well. For example, the user may specify his or her slowest preferred convey rate by providing user input to a slowest convey rate element 612, and may specify his or her fastest preferred convey rate by providing user input to a fastest convey rate element 614. However, the content pacing service may also automatically determine a user's slowest and fastest preferred convey rate and display those in slowest convey rate element 612 and fastest convey rate element 614. For example, the content pacing service may determine that for a particular narrator, whenever the convey rate reaches 1.5×, the user slows down the convey rate. Alternately, the content pacing service may determine that whenever the convey rate falls to 0.75×, the user increases the convey rate. Accordingly, these rates need not be manually specified by the user. Additionally, a user may have varying preferred convey rates based on the item of content to be conveyed, or a narrator or other performer of the item of content to be conveyed. The content pacing service may maintain data on user preferences for convey rates for particular items of content or for particular performers. This information may also be provided by a human worker of the human interaction task system and provided to the content pacing service. For example, the human interaction task system may convey a portion of an item of content at one or more convey rates to a human worker, along with a query such as, "Is this content being conveyed too quickly, too slowly, or at preferable rate?" The human worker may respond to this query, with the results routed to the content pacing service for use in setting preferred convey rates.

The user interface 600 may also include a generated convey rate element 616. As discussed above, this generated convey rate may be substantially equal to the total base duration of the portion or portions of the item of content selected divided by the convey duration. In this example, the total base duration of the two selected chapters, as indicated by selected portion selection elements 606A and 606B, is two hours and thirty minutes. The convey duration for this example is two hours, as indicated in convey duration element 610. Accordingly, the generated convey rate is two and a half hours divided by two hours, or 1.25×. If the calculated convey rate is outside of the convey rate range as indicated by slowest convey rate element 612 and fastest convey rate 614, a notification (such as a dialog box or an audible alert) may optionally be communicated to the user to indicate that the user has selected too much or too little content to be conveyed at a preferred rate within the convey duration.

Figure 7:
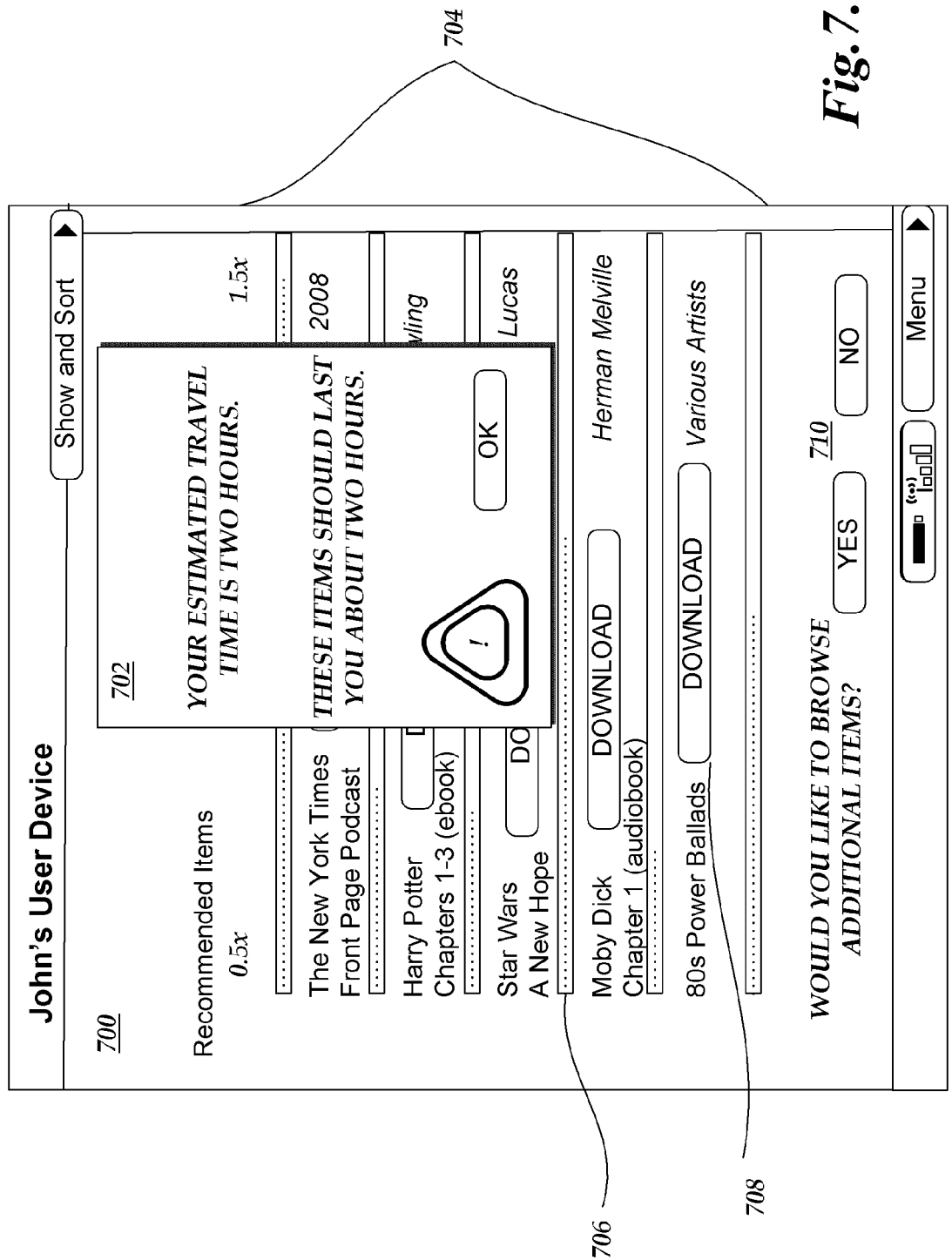
FIG. 7 is a pictorial diagram depicting an example user interface through which items of content may be recommended to a user.

FIG. 7 depicts an illustrative user interface 700 for providing one or more recommendations of portions of items of content to be conveyed during a particular convey duration. These recommendations may be generated by following the illustrated routine 500 as shown in and as discussed with respect to FIG. 5.

The user interface 700 may include a message element 702. The message element 702 may include the convey duration, whether specified by the user or determined by the content pacing service.

The user interface 700 may also display recommendations of the one or more portions of the one or more items of content as shown in recommendation pane 704. For example, the recommendations may include an indication of one or more portions of one or more items of content, such as a title of the item of content; a listing of chapters or other portions; a type of the item of content; and so forth. Each recommendation may be associated with a particular convey rate which may be indicated by a convey rate bar 706. For example, portions of items of content that would be conveyed at a convey rate faster than 1× may have a relatively full convey rate bar 706, whereas portions of items of content that will be conveyed at a convey rate slower than 1× may have a relatively empty convey rate bar 706. Portions of items of content that would be conveyed at 1× rate during the convey duration may have a convey rate bar 706 that is approximately half full. Other ways of depicting generated convey rates for a recommended portion of an item of content are possible.

The user interface 700 may contain a download element 708 which may transmit a request for the recommended portion of the recommended item of content to a content pacing server. In response to receiving the request, the content pacing server may retrieve the recommended item of content or portion of the item of content and transmit it to the user computing device. Alternately the recommended items of content may already be stored on the user's computing device and may already be available, in which case it may be unnecessary to have the content pacing server transmit the recommended portions of the items of content to the user computing device.

If the user is not satisfied with the recommendations provided by the content pacing service and wishes to browse additional recommendations for portions of items of content to be conveyed during the convey duration, the user may indicate as such by interacting with the browse additional element 710. The content pacing service may generate additional recommendations in response.

The user interfaces shown in and described with respect to FIG. 6 and FIG. 7 may be incorporated into a frontend interface that directs input or recommendation requests to the content pacing service. In one embodiment, the user interfaces described above are displayed on a content page hosted on a network. When the content page is accessed by a user through a user computing device, requests for recommendations of content or pacing settings (such as a range of preferred convey rates) may be made through these user interfaces. In response to receiving the user input, the content page may call one or more functions of the content pacing service through an application programming interface (API). For example, the content pacing server may be directed through remote procedure calls to generate one or more recommendations and to transmit them to the user computing device. The content page need not be hosted by the content pacing server.

In another embodiment, the user interfaces shown in and described with respect to FIG. 6 and FIG. 7 are incorporated into client software installed on a user computing device or a rights-holder computing device. The client software may receive input through these user interfaces, and, in response, direct remote procedure calls to the content pacing server. For example, the content pacing server may be directed through remote procedure calls to generate one or more recommendations for portions of items of content to be conveyed during a particular convey duration.

Various illustrative embodiments of the content pacing service have been discussed above in the context of content that may be passively consumed by the user, e.g., non-interactive content such as audiobooks, music, television programs, movies, etc. These items of content may be conveyed without necessarily requiring user input. The content pacing service may also be implemented with interactive items of content, such as electronic books and video games. The user's input (e.g., turning a page or completing a level) may be required for the item of content to be consumed or conveyed. For instance, the content pacing service may be used to recommend and/or convey one or more portions of an electronic book. The convey rate for the electronic book may be determined by the user's reading speed, e.g., in words per minute, pages per minute, or some other measure. Accordingly, the content pacing service may, based on the user's reading speed, recommend a portion of an electronic book for a convey duration that is roughly equal to the user's reading speed multiplied by the convey duration. For example, an electronic book may comprise a first short story with thirty pages, a second short story with thirty pages, and a third short story with fifty pages. For a user with a convey duration of one hour and a reading speed of one page per minute, the content pacing service may generate a recommendation that includes the first two short stories of the electronic book, as there are sixty pages in the two short stories. Alternately, for the same user, the content pacing service may generate a recommendation that includes the third short story, which would take the user an estimated fifty minutes to consume at one page a minute, as fifty minutes is relatively close to one hour.

Many of the operations of the content pacing service are sufficiently mathematically or technically complex that one or more computing devices may be necessary to carry them out. For example, generating recommendations for portions of items of content to be conveyed in a particular convey duration may, in some embodiments, require solving an NP-complete problem. NP-complete problems are difficult to solve even for non-general solutions, and algorithms for solving them, such as dynamic programming, brute force, and meet-in-the-middle techniques, effectively require resort to one or more computing devices. Additionally, a computing device may be required to convey a portion of an item of content, as discussed above.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z" ☐ unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    an electronic data store configured to store an audiobook; and
    a computing device in communication with the electronic data store, the computing device configured to:
        determine a convey duration, the convey duration representing an amount of time a user has to consume the audiobook;
        determine a bound for a preferred convey rate for the user;
        select a first portion of the audiobook using at least two reference points occurring before an end of the audiobook, a first reference point of the at least two reference points occurring before the end of the audiobook, and a second reference point of the at least two reference points occurring after the first reference point;
        determine a base duration of the first portion of the audiobook selected using the at least two reference points, the base duration comprising an amount of time over which the first portion of the audiobook is currently set to be conveyed to the user;
        determine a first suggested convey rate for the first portion of the audiobook, the first suggested convey rate determined at least in accordance with the base duration of the first portion of the audiobook and the convey duration;
        determine that the first suggested convey rate for the first portion of the audiobook selected using the at least two reference points does not satisfy the bound for the preferred convey rate for the user;
        select, without intervention by the user, a second portion of the audiobook using at least two different reference points, wherein the at least two different reference points are distinct from at least one of the first reference point and the second reference point;
        determine a second suggested convey rate at which to convey, during the convey duration, the second portion of the audiobook;
        determine that the second suggested convey rate for the second portion of the audiobook satisfies the bound for the preferred convey rate for the user; and
        convey the second portion of the audiobook substantially at the second suggested convey rate.

2. The system of claim 1, wherein the first reference point of the at least two reference points comprises a beginning of a chapter of the audiobook; and the second reference point of the at least two reference points comprises an end of the chapter of the audiobook.

3. The system of claim 1, wherein the convey duration is determined by at least one of user input and an estimated remaining time of operation of the computing device.

4. The system of claim 1, wherein the computing device is further configured to:
    determine a current time; and
    estimate a time of arrival at a destination; and
    wherein the convey duration is substantially equal to a difference between the time of arrival that has been estimated and the current time.

5. The system of claim 1, wherein the second portion of the audiobook comprises at least one of a sentence of the audiobook; a paragraph of the audiobook; a chapter of the audiobook; and at least two chapters of the audiobook.

6. A computer-implemented method comprising:
    under control of one or more computing devices configured with specific computer-executable instructions,
        receiving a request for a recommendation of an item of content to be consumed during a convey duration;
        determining a slowest preferred convey rate;
        determining a fastest preferred convey rate;
        determining a preferred base duration bound in accordance with at least one of the slowest preferred convey rate, the fastest preferred convey rate, and the convey duration;
        identifying at least two reference points in the item of content, a first reference point of the at least two reference points occurring after a beginning of the item of content, a second reference point of the at least two reference points occurring before an end of the item of content;

identifying a first portion of the item of content using the at least two reference points;

determining the first portion has a first total base duration that does not satisfy the preferred base duration bound; and identifying, without user input, a second portion of the item of content using at least two different reference points, wherein the at least two different reference points are distinct from at least one of the at least two reference points;

determining the second portion has a second total base duration that satisfies the preferred base duration bound; and generating a recommendation for the second portion of item of content as identified with the at least two different reference points.

7. The computer-implemented method of claim 6, wherein the first portion of the item of content falls between the first reference point and the second reference point.

8. The computer-implemented method of claim 6 further comprising:

identifying that the first reference point in the item of content corresponds to a first timestamp; and determining a current position of consumption in the item of content that corresponds to a second timestamp;

wherein the first portion falls between the first timestamp and the second timestamp.

9. The computer-implemented method of claim 6 further comprising receiving a selection of a type of content, and wherein the item of content comprises the type of content.

10. The computer-implemented method of claim 6, wherein the item of content is related to an item of content stored with a computing device associated with the user.

11. The computer-implemented method of claim 10, wherein the item of content is related to the stored item of content by at least one of a common author, a common performer, a common director, a common series, a common genre, and a common subject.

* * * * *

UNITED STATES PATENT AND TRADEMARK OFFICE
CERTIFICATE OF CORRECTION

PATENT NO. : 9,679,608 B2  Page 1 of 1
APPLICATION NO. : 13/536711
DATED : June 13, 2017
INVENTOR(S) : Douglas Cho Hwang It is certified that error appears in the above-identified patent and that said Letters Patent is hereby corrected as shown below:

In Column 19 at Line 29, Change "X, Y and Z" □ unless" to --X, Y and Z" unless--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*